United States Patent [19]

Land

[11] Patent Number: 4,741,425
[45] Date of Patent: May 3, 1988

[54] CHUTE FOR BALE LOADER

[76] Inventor: Steven E. Land, Rte. 2, Box 23, Adrian, Oreg. 97901

[21] Appl. No.: 528,415

[22] Filed: Sep. 1, 1983

[51] Int. Cl.⁴ ............................................. B65G 11/20
[52] U.S. Cl. ...................................... 193/45; 198/399
[58] Field of Search ................... 193/45; 198/399, 518; 414/507, 528, 111

[56] References Cited

U.S. PATENT DOCUMENTS

| | | | |
|---|---|---|---|
| 3,243,028 | 3/1966 | Tufts | 193/44 X |
| 3,948,399 | 4/1976 | Michaels | 198/518 |
| 4,150,756 | 4/1979 | Butler | 414/757 X |
| 4,187,941 | 2/1980 | Martin | 193/45 X |
| 4,190,392 | 2/1980 | Butler | 193/44 X |

*Primary Examiner*—Andres Kashnikow
*Assistant Examiner*—Mary Beth O. Jones
*Attorney, Agent, or Firm*—Paul F. Horton

[57] ABSTRACT

An improved chute for a bale loader which enables a quarter-turn rotation of faulty positioned bales prior to loading of the bales. A wheel rotatably mounted on the forward most end of one of a pair of converging arms on the chute is operable to engage the side of a bale of hay, straw, or the like. The wheel, being rearwardly and inwardly inclined toward the bale-receiving channel defined by the conveying arm members of the chute causes one quarter rotation of the bale. The wheel is of proper size to allow the operator of the loader to selectively engage only those bales requiring rotation. The wheel may be spring mounted to minimize repairs and may be driven by an external power source.

8 Claims, 3 Drawing Sheets

, 741,425

CHUTE FOR BALE LOADER

BACKGROUND OF THE INVENTION

1. Field of the Invention

This invention relates, in general, to bale loaders and, in particular, to an improved chute for a bale loader which is operable to give a quarter-turn to mis-positioned bales.

2. Description of the Prior Art

Bales of hay are conventionally of greater breadth than thickness so that the top and bottom "flat" surfaces have greater surface area than the "edge" sides. Bales are normally bound about their top and bottom surfaces. To prevent rotting and to provide maximum surface area for drying, it is highly preferred that the bale be discharged from the baler onto its edge and many balers have discharge chutes to provide this function. U.S. Pat. No. 3,243,028 to G. O. Tufts and U.S. Pat. No. 4,187,941 issued to E. Joel Martin show the current state of the art in this regard. Other patents, such as those to Butler, U.S. Pat. Nos. 4,150,756 and 4,190,392 show rotation of bales for stacking, after loading.

Unfortunately, a number of bales, because of their top heavy position when laying on their edge, land on their bottom or flat surface. This problem is particularly acute where the ground is uneven causing severe jiggling of the baler; where baling is done on the slope of a hill; and where irrigation corrugates are present causing the bale to flip onto its flat side after being discharged from the baler. It is estimated that approximately 20% of the bales discharged by the baler end up in the incorrect position. Baler loaders having bale receiving chutes conventionally are provided with chutes which converge to a narrow bale receiving channel and are adapted to receive bales only which are lying on the ground on their "edge" as opposed to their wider "flat" side. Engaging a bale lying on its flat side causes jamming of the receiving chute because the bale is wider than the chute at its narrowest part. Therefore, the operator heretofore was required to dismount his machine, walk to and turn the bale, return to his machine, and proceed with loading. Such procedure may double the working time of both the operator and the machine and is therefore very costly as well as frustrating to the operator.

SUMMARY OF THE INVENTION

The present invention comprises, generally, an improved chute for a bale loader or wagon including a chute having converging bale receiving arm members; one of the arm members provided at its forward most end with a rotatable bale-engaging wheel tilted at such an angle so as to rotate and reposition the bale.

It is therefore the primary object of the present invention to provide an improved chute for a bale loader which includes a rotatable wheel adapted to engage a bale for rotating a mispositioned bale one-quarter turn for loading.

DETAILED DESCRIPTION OF THE INVENTION

Figure 1:
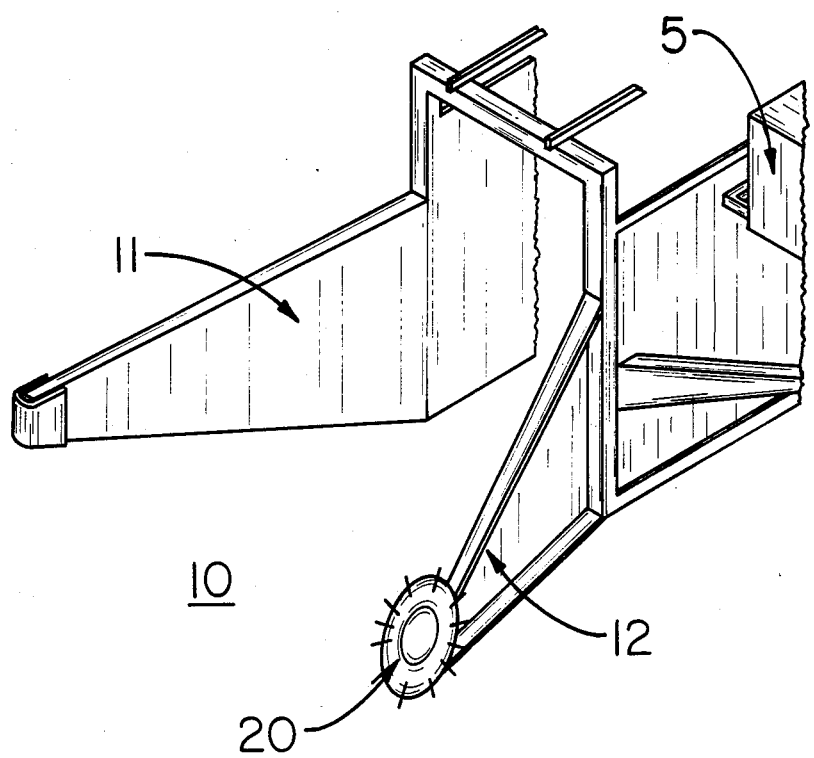
FIG. 1 is a perspective view of the improved bale chute of the present invention.
Figure 2:
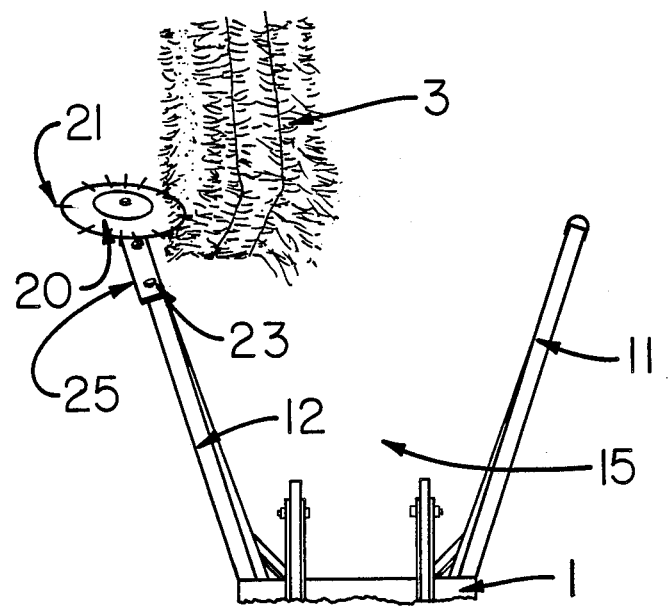
FIG. 2 is a plan view of the improved chute showing engagement between bale and wheel for turning the bale.
Figure 3:
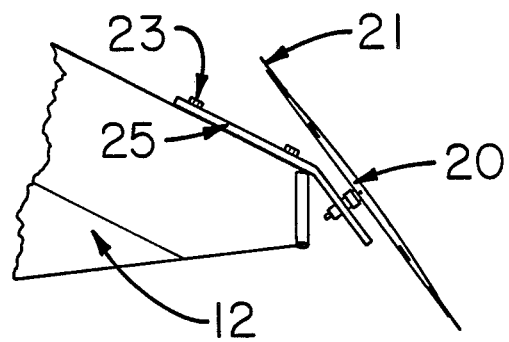
FIG. 3 is an inside view of one conveying arm of the chute of the present invention showing an attached wheel.

Referring now to the drawings, an embodiment to be preferred of the present invention is disclosed. Improved chute 10 is attached, as is usual, to a stack or bale wagon 5, shown in part, or may be attached, if desired, to any other load carrier vehicle. Chute 10, except for the bale turning mechanism of the present invention, is presently in existence and is of the type commonly associated with stackers and loaders sold under the trademark "New Holland". The chute includes two converging arm members 11 and 12 defining a channel 15 therebetween for the reception and alignment of bales 3 of hay, straw, or the like, which are then conveyed to the stacker, wagon, or other bale carrier 5, by converyor 1.

Mounted adjacent the forwardmost end of one of the converging arm members, preferably the left arm member 12, as viewed from the rear, is a rotatable wheel 20 which may be of any desired form; a disc shaped form, as shown in the Figures, being preferred. It is contemplated and is preferred that the wheel be mounted adjacent the fowardmost end of the chute. "Adjacent" as stated herein and in the appended claims means within the fowardmost half of the chute. The wheel is of sufficient size, thirteen inches in diameter in the preferred embodiment, to overlap, i.e., extend forward of the conveying arm to which it is attached and to extend within the channel defined by the converging arms, for engaging and turning bale 3. To prevent slippage in contact between wheel 20 and bale 3, the wheel may be provided with a plurality of radially projecting splines or rods 21 which penetrate the bale for a short distance during rotation of the wheel. Wheel 20 is preferably mounted directly to the arm member by a bracket 25 affixed to the top surface of the arm member by two or more nut-bolt assemblies, designated generally by the numeral 23. The bracket may be bent, as shown, to provide the correct angle of rotation of wheel 20 relative to the bale.

Figure 4:
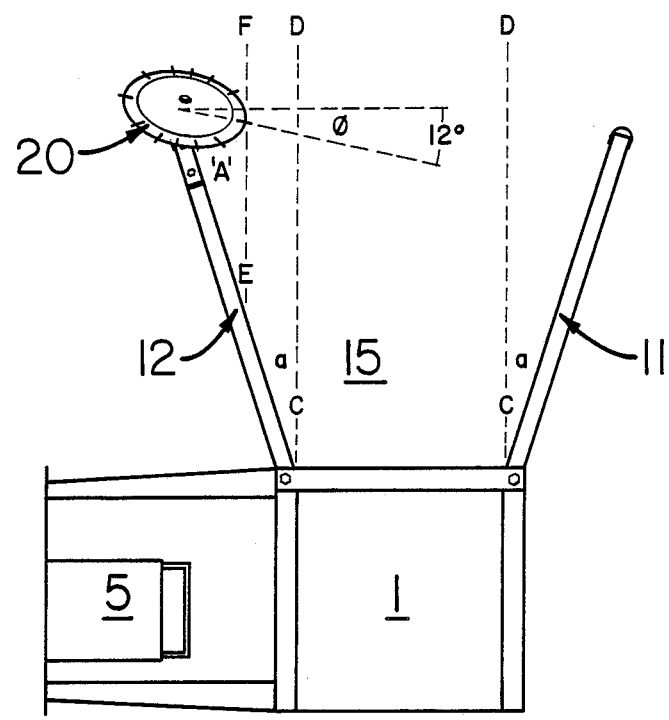
FIG. 4 is a plan sketch of the improved chute showing preferred mounting angle.
Figure 5:
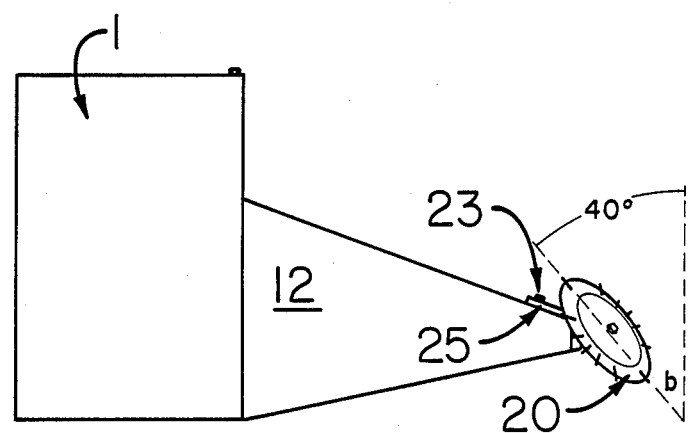
FIG. 5 is a side sketch of the improved chute showing the preferred mounting angle.

Referring now to FIGS. 4 and 5, the preferred angle of rotation of wheel 20 is shown to advantage. The wheel is inclined inwardly toward the opposing converging arm member 11, and therefore channel 15 defined by the arm members, as shown in FIG. 4. Wheel 20 is tilted inwardly to an angle $\phi$ of from 1 degree-25 degrees relative to an imaginary line, shown as a broken line, extending between the forwardmost ends of the converging arm members. An inward inclination of approximately 12 degrees is preferred when using a wheel thirteen inches in diameter. It is important that a balance be maintained between angle and wheel dimension so that only an area of selected size, represented by the letter A, between the arm member 12 and broken line E-F is impacted. This, for the reason that the bales which are already correctly positioned, i.e., lying on their edge, are not to be brought into contact with wheel 20 by the operator, but rather should be aligned between the two pairs of broken lines C-D as shown in the Figure. This may be done by contacting the bale with converging arm member 11.

Shown to advantage in FIG. 5, wheel 20 is also rearwardly inclined, so as to make contact with the bale at substantially the lowest point on the wheel to provide a lifting and turning action. The plane of the wheel, perpendicular to its rotational axis, is rearwardly inclined from vertical at an angle of 20 degrees-60 degrees, preferably 40 degrees, in the preferred embodiment, as shown by angle b in the sketch.

While wheel 20 is preferably journaled for rotation in bracket 25 which is affixed to one of the converging arm members of the chute, it is contemplated that the wheel may be held in position by a member separate from the chute. Particularly, it may be of advantage to mount the wheel to a hydraulic ram or extensible rod for shifting the entire wheel along a linear path, when the device is used with a towed bale wagon. It is also contemplated that wheel 20 may be power driven from an external source. Additionally, it is contemplated that the wheel may be suspended by one or more springs of sufficient rigidity to turn bales out of sufficient resiliency to "give" if more solid objects are encountered for preventing damage to the apparatus. For example, as shown in drawing 3, bracket 25 may be made of resilient spring steel.

In operation, and assuming the improved chute of the present invention is used in conjunction with a self-propelled loader, the operator will approach a properly positioned bale, lying on its edge, so that no contact is made between bale and wheel; any contact being with converging arm 11 for receiving the bale in the channel. If the bale is mispositioned, i.e., lying on its "flat" surface, the operator aligns the bale with the cute, making contact with wheel 20, the lower most contacting portion of which is approximately six inches off the ground. The forward motion of the loader causes rotation of the wheel in its engagement with the bale. Splines 21 of wheel 20 penetrate the bale, providing sufficient friction for raising and rotating the bale one-quarter turn. The opposing arm 11 of the chute prevents the bale from flipping over.

Having thus described in detail a preferred embodiment of the present invention along with several modifications, it will be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. An improved bale chute of the type attachable to a bale loader and having opposing arm members for receiving a bale, wherein the improvement comprises a wheel rotatably mounted on the forwardmost end of one of said arm members rearwardly inclined and said wheel adapted to engage and lift a bale for rotating the bale 90 degrees.

2. The apparatus as described in claim 1 wherein said wheel is in the form of a disc.

3. The apparatus as described in claim 1 wherein said wheel is provided with a plurality of elongated and radially extending projections extending beyond the wheel periphery and operable to penetrate a bale for rotation of the bale.

4. The apparatus as described in claim 1 wherein said wheel is inclined inwardly toward the opposing arm member.

5. An improved bale chute for bale loaders having a chute of the type provided with converging arm members defining a channel for bale alignment wherein the improvement comprises a wheel rotatably mounted on the forwardmost end portion of one of said arm members, said wheel extending forward of said arm and within said channel to overlap said arm for engaging and turning a bale.

6. The apparatus as described in claim 5 wherein the plane of said wheel is rearwardly inclined.

7. The apparatus as described in claim 5 wherein said wheel is in the form of a disc having a plurality of radially projecting splines adapted to penetrate a bale for the rotation thereof.

8. The apparatus as described in claim 5 further comprising a flexible spring member affixed to said arm member, said wheel mounted upon said spring member for resilient contact between wheel and bale.

* * * * *